United States Patent
Frank

(12)
(10) Patent No.: US 6,293,681 B1
(45) Date of Patent: Sep. 25, 2001

(54) IMAGE VIEWING APPARATUS

(76) Inventor: Stephen J. Frank, 3216 Abell Ave., Baltimore, MD (US) 21218

(*) Notice: Subject to any disclaimer, the term of this patent is extended or adjusted under 35 U.S.C. 154(b) by 0 days.

(21) Appl. No.: 09/519,387

(22) Filed: Mar. 3, 2000

(51) Int. Cl.$^7$ .................................................. G02B 7/182
(52) U.S. Cl. .......................... 359/871; 359/872; 359/874; 359/875; 359/876
(58) Field of Search .................................. 359/871, 872, 359/874, 875, 876; 248/479, 487

(56) References Cited

U.S. PATENT DOCUMENTS

| | | | |
|---|---|---|---|
| 370,623 | 9/1887 | Hooker | 359/855 |
| 1,855,095 | 4/1932 | Campbell | 359/855 |
| 1,991,054 | 2/1935 | Hampke | 350/618 |
| 3,684,380 | 8/1972 | Benchley, Jr. | 356/138 |
| 3,914,029 * | 10/1975 | Hoplock | 359/849 |
| 3,976,275 * | 8/1976 | Clark | 248/477 |
| 4,268,121 | 5/1981 | Peskin | 350/306 |
| 4,580,880 | 4/1986 | Watson | 350/621 |
| 4,639,102 | 1/1987 | Fetko | 350/626 |
| 4,720,184 | 1/1988 | Watson | 350/617 |
| 4,890,909 * | 1/1990 | Schmidt et al. | 359/871 |
| 5,124,857 * | 6/1992 | Pitz | 359/872 |
| 5,148,327 | 9/1992 | Gaxiola | 359/855 |
| 5,357,377 | 10/1994 | Payne, Jr. et al. | 359/855 |
| 5,359,461 * | 10/1994 | Rice et al. | 248/469 |
| 5,430,578 | 7/1995 | Reagan | 359/855 |
| 5,438,457 * | 8/1995 | Moore | 359/855 |
| 5,453,915 * | 9/1995 | Bradley, III | 362/144 |
| 5,625,501 | 4/1997 | Taggert | 359/855 |
| 5,997,147 | 12/1999 | Tatoian | 359/856 |
| 6,099,133 * | 8/2000 | Wright | 359/880 |
| 6,217,178 * | 4/2001 | Drumheller et al. | 359/849 |

FOREIGN PATENT DOCUMENTS

| | | | |
|---|---|---|---|
| 0056968 | 1/1982 | (DE) | 359/856 |
| 3921103A | 11/1990 | (DE) | 359/856 |

OTHER PUBLICATIONS

N. Silker Feb. 2000, Internet: www.realimagemirror.com.
J. Walker Feb. 2000, Internet: www.truemirror.com.

* cited by examiner

Primary Examiner—Mohammad Sikder
(74) Attorney, Agent, or Firm—Larry J. Guffey

(57) ABSTRACT

A viewing device permitting users to view true, non-reversed images of objects out of the viewer's normal line of sight as, for example, an image placed or projected behind the viewer. The device includes at least one pair of mirrors adjustably disposed in substantially direct side-by-side relationship to form a mutual angle. While the mirrors may be supported in a variety of ways, they are preferably disposed to rotate about a common axis, and may be held in place by friction mounts. In the present structure, the common axis is represented by a generally vertical support, which itself is adjustably attached to a second support so as to be adjustable and three-dimensionally rotatable. To adjust the reflective angles of an image being viewed, pressure applied to the housing of one mirror causes it to pivot against its frictional mount so as to change its angular relationship with respect to the second mirror. Either or both mirrors may be adjusted to perfect the view. The purpose is to achieve doubly reflected image. The result of such double refection is that the image is perceived by the viewer as non-reversed, as opposed to reversed, as it would appear on singular reflection. Thus, images of words, diagrams, or other objects best viewed in non-reversed mode to be comprehended will appear to the viewer in seemingly normal mode. This device is particularly applicable to speakers, presenters or sign language interpreters for the deaf, but may have many other applications.

5 Claims, 4 Drawing Sheets

IMAGE VIEWING APPARATUS

BACKGROUND OF THE INVENTION

1. Field of the Invention

The present invention generally relates to optical systems. More particularly, this invention relates to an optical apparatus that may expand a user's field of view or utilize successive reflections to yield a true image.

2. Description of the Related Art

There are many occasions when individuals, such as sign language interpreters or those who are speaking before an audience, need to steadily face in one direction, but at the same time have visual access to information that exists outside of their field of view. Mirrors, can be of some assistance. However, if the information needs to be viewed in a non-reversed version, for example, when the information is to be read, single mirrors are essentially useless.

Several, double-mirror assemblies have been disclosed in the prior art that produce an image which is not reversed. However, such mirror assemblies appear to have only been directed at providing a true image of the one who is using such an assembly to view oneself. Thus, the relative orientations of such mirrors are fixed at a limited number of angles, usually at the 90 degree angle required to yield such a non-reversed image. See U.S. Pat. Nos. 5,625,501, 5,430,578, 5,357,377, 4,639,102, 4,580,880, 1,991,054, 1,855,095 and 370,623 and foreign patent materials European Patent Office No. 0056968 and Germany 3921-103-A. Such non-reversing mirrors are also the subject of advertisements appearing on the Internet. For example, see web pages that existed as of February 2000 at www.realimagemirror.com and www.truemirror.com.

Similarly, the prior art discloses several mirror assemblies that have been designed to expand a user's field of view for specific applications. See U.S. Pat. Nos. 5,148,327, 4,268,121 and 3,684,380.

However, it is not apparent that the prior art reveals any attempts directed at producing a portable, fully-adjustable mirror system that can be used for the purposes of either yielding a non-reversed image or expanding its user's field of view.

The need exists for such a mirror system. This need is especially acute for sign language interpreters who often need to keep general eye contact with those for whom they are signing, while also trying to turn and see the visual materials of the person whose auditor) message they are communicating. Similarly, such a need exists with those who are making general presentations before audiences and need to steadily face the audience while also referring to visual information that is out of their direct field-of-view.

The problems and limitations enumerated above are not intended to be exhaustive, but rather are among many which tend to impair the effectiveness of previously known mirror systems. Other noteworthy problems and limitations may also exist; however, those presented above should be sufficient to demonstrate that the mirror systems appearing in the prior art have not been altogether satisfactory.

SUMMARY OF THE INVENTION

The present invention is generally directed to satisfying the needs set forth above and the limitations and problems identified with prior mirror systems.

In accordance with one preferred embodiment of the present invention, an image viewing apparatus that can remedy many of the problems and limitations described above includes a support member to which a pair of mirror housings are rotatably and detachably mounted. These housings each contain a mirror having a front reflective surface. Meanwhile, the housings are connected to the support member by straps whose center portions are adapted so as to frictionally wrap around and provide for rotation of the housings and their mirrors about the support member.

Since each of the mirrors may be independently set and remain in place at desired rotational orientations with respect to the support member, a user of this embodiment may, upon properly orienting the mirrors, view an object that is behind the user in either a version that is a reversed or a true image of the object.

Additionally, the support member has a connector which allows it to be securely and detachably connected with a stand or supporting mechanism. This connection allows the support member, and thus the mirrors, to be oriented in a full, three-dimensional spectrum of planes for viewing an image that is out of a user's initial field of view.

In another embodiment, the present invention is a process of sign language interpreting for communication with deaf and hard of hearing people regarding written information that is outside of an interpreter's direct field of view. This process comprises the steps of providing an image viewing apparatus, such as that described above, to allow the interpreter to see a true image of the written information, with the interpreter orienting the first mirror to view the information, while orienting the second mirror to provide a reversal of the image seen in the first mirror so as to yield a true version of the information.

In another embodiment, the present invention is a process of directly communicating with an audience regarding visual information that is outside of a communicator's direct field of view. This process comprises the steps of providing an image viewing apparatus, such as that described above, to allow the communicator the communicator to see the visual information by appropriately orienting the apparatus' mirrors.

Thus, there has been summarized above, rather broadly, the more important features of the present invention in order that the detailed description that follows may be better understood and appreciated. There are, of course, additional features of the invention that will be described hereinafter and which will form the subject matter of the claims appended thereto.

In this respect, before explaining at least one embodiment of the present invention in detail it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures for carrying out the purposes of the present invention. It is important, therefore, that the claims be regarded as including such equivalent constructions insofar as they do not depart from the spirit and scope of the present invention.

It is therefore an object of the present invention to provide an image viewing apparatus that overcomes the limitations of the prior art described above.

It is another object of the present invention to provide a portable, adjustable, image viewing apparatus that can either greatly expand a user's field of view or yield true images of objects that are outside of a user's field of view.

It is a yet another object of the present invention to provide a mirror system that contains at least two mirrors, wherein the viewing angles of the mirrors can be adjustably fixed so that information, which appears outside of a user's field of view, will be reflected in a first mirror, but projected and reversed into a second mirror which is within a user's field of view so that the user sees in the second mirror a true/positive/non-reversed image of the information.

It is a further object of the present invention to provide a mirror system having a support member to which are rotatably and detachably mounted mirrors that may be independently adjusted with respect to each other and the support member, which is itself capable of being oriented in wide range of positions relative to a general mounting stand.

It is a still further object of the present invention to provide an image viewing apparatus that is easy to use and has great flexibility with respect to the component parts that may be used in the apparatus.

These and other objects and advantages of the present invention will become readily apparent as the invention is better understood by reference to the accompanying drawings and the detailed description that follows.

DESCRIPTION OF THE PREFERRED EMBODIMENT

Figure 5:
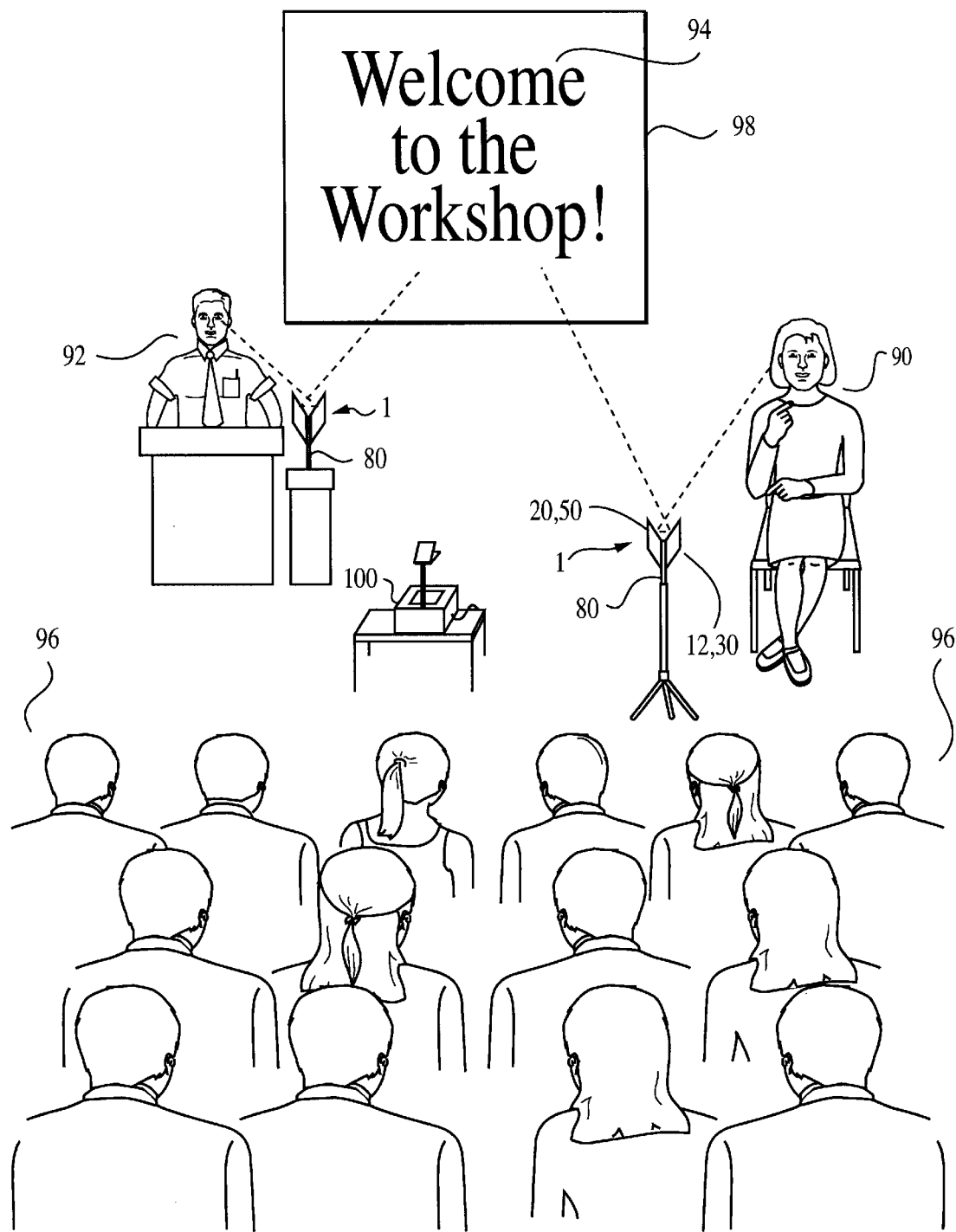
FIG. 5 is a plan view of the present invention which shows it being used.
Figure 6:
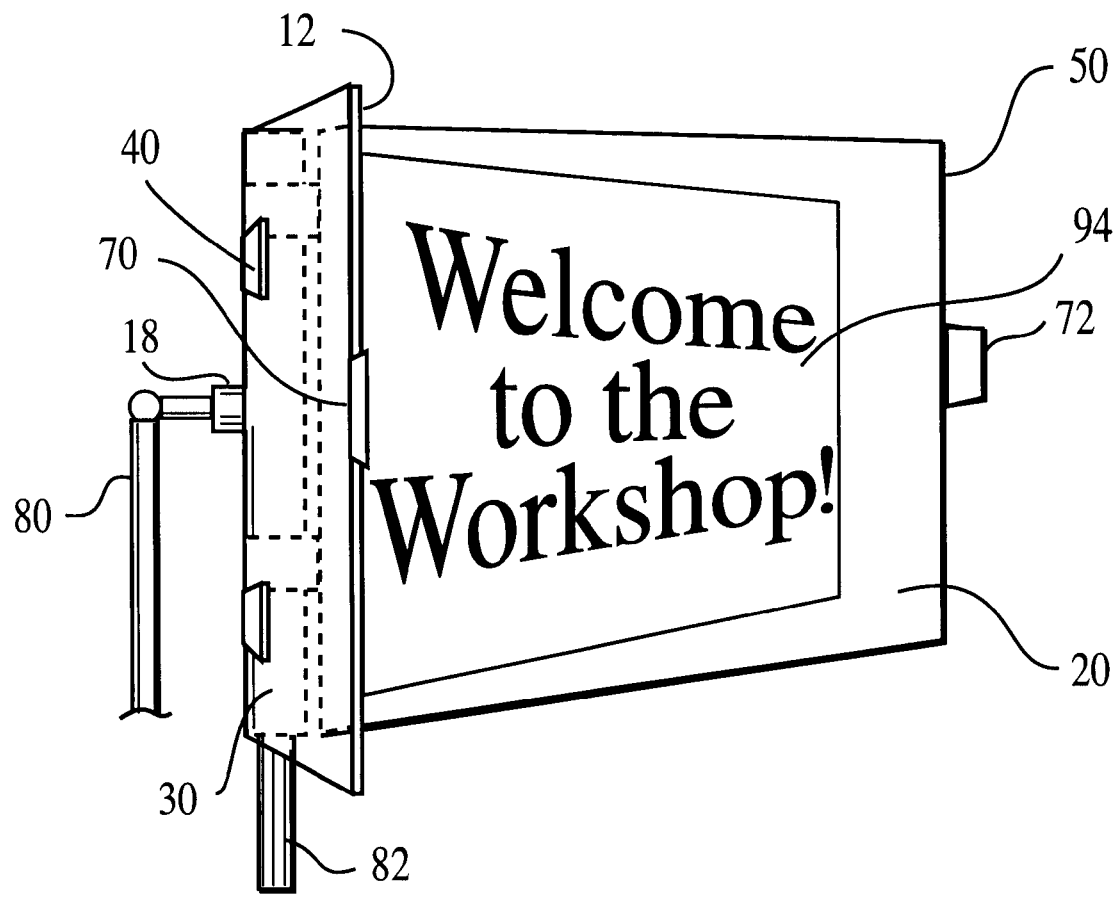
FIG. 6 is an isometric view of the interpreter's view of the second mirror shown in FIG. 5.

Referring now to the drawings wherein are shown preferred embodiments and wherein like reference numerals designate like elements throughout, there is shown in FIG. 1–4 the respective front, top, rear, and side views of an embodiment of the present invention in the form of an image viewing apparatus (1). Furthermore, FIG. 5 and FIG. 6 illustrate a use of the present invention.

This embodiment is seen to include an elongated support member (10) to which are rotatably and detachably mounted, first and second mirrors (12, 20), and the mirrors are positioned side-by-side, laterally disposed relationship so as to have the face of the mirrors mutually adjustable toward and away from each other, while maintaining a substantially reflective relationship between both of which have front (14, 22) and rear (16, 24) surfaces, with the front surfaces being reflective. The rear (16, 24) surfaces of each of these mirrors (12, 20) are detachably mounted to the inside (32, 52) surfaces of mirror housings (30, 50). These mountings can be made by a number of well know methods, including the use of an adhesive, magnets or fasteners such as screws, rivets or hook and loop materials. A key advantage to this type of detachable mounting is that it allows one to easily interchange various mirrors having different optical properties, with these properties being chosen so as to optimize the invention's usefulness.

These housings (30, 50) are themselves rotatably and detachably connected to the elongated support member (10) by straps (40, 60). These straps each have ends (42, 44 and 62, 64) and center portions (46, 66), with the ends being attached to the mirror housings (30, 50) and the center portions (46, 66) adapted so as to frictionally wrap around the support member (10). It should be recognized that there exist many other well-known means for making such rotatable and detachable connections. For example, one could use some type of well-known collar, clamp or pivot arm mechanism.

Figure 2A:
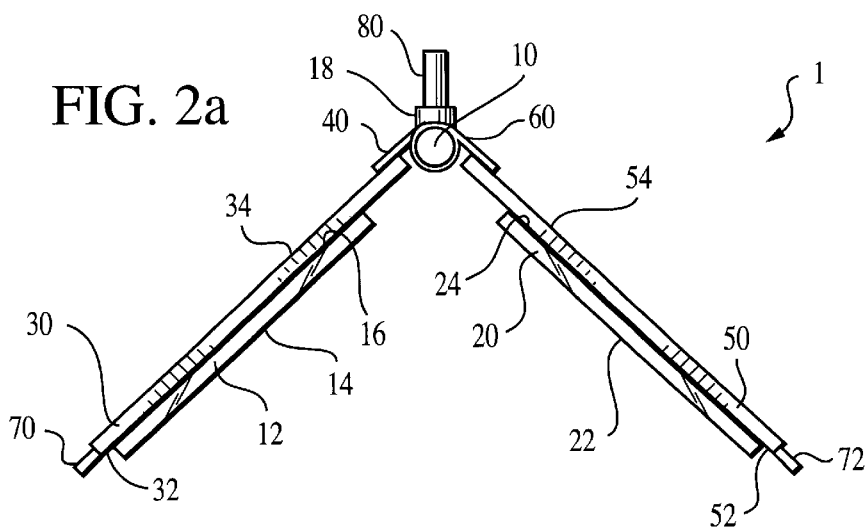
FIG. 2($a$) is a top view of the embodiment shown in FIG. 1, with FIG. 2($b$) and 2($c$) showing details of the straps used in this embodiment.
Figure 2B:
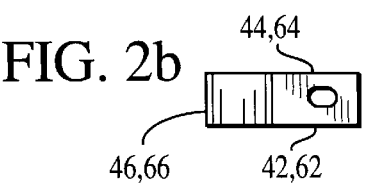
Figure 2C:
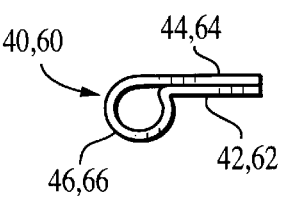
Figure 3:
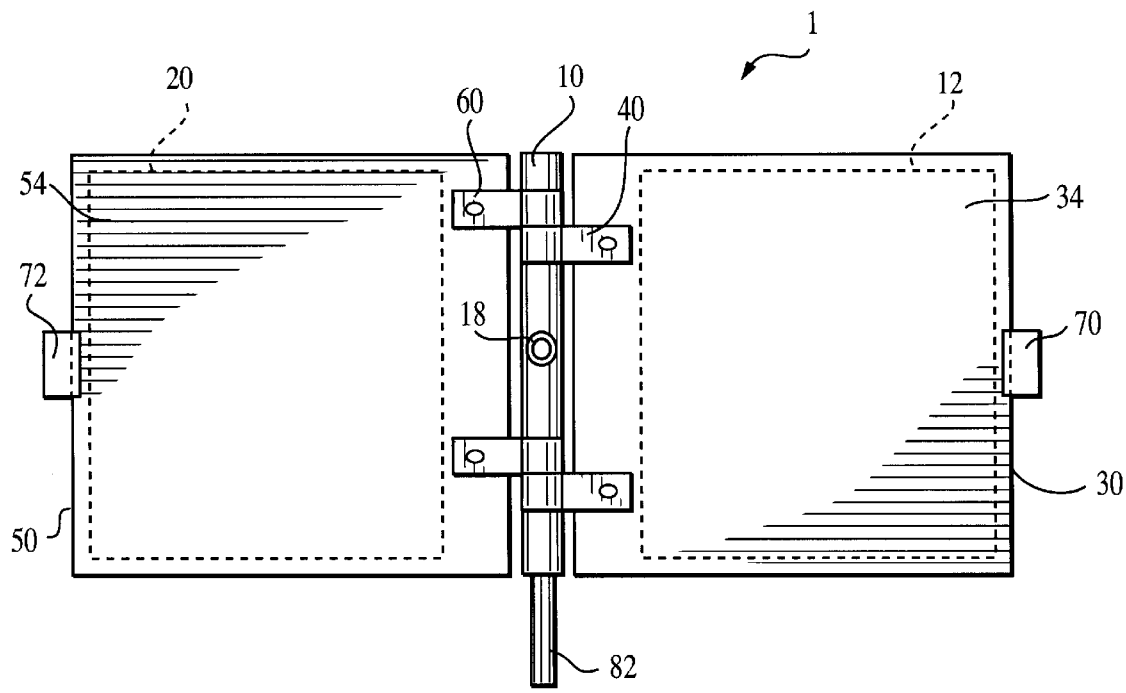
FIG. 3 is a rear view of the embodiment shown in FIG. 1.

Shown in FIG. 2($b$) and 2($c$) are details of the straps (40, 60) used in this embodiment of the present invention. The strap ends are seen to be bonded together so as to provide the frictional fit, with these ends then being fastened by conventional means, such as screws, snaps or slips, to the housings. Furthermore, these ends may connect with clamping surfaces which then attach to the housings or directly to the mirrors.

Alternatively, the mirror housings (30, 50) may have holes drilled through them to allow the strap ends to be attached securely by the use of fasteners, such as screws or wingnuts. Similarly, to prevent slippage of the straps on the support member (10), the support member's outer surface may be grooved so as to allow the straps to fit in such grooves or recesses.

This configuration allows each of the mirrors (12, 20) to be independently fixed at desired rotational orientations with respect to the support member (10). Thus, a user of this apparatus (1), who places it before himself or herself and then properly orients these mirrors (12, 20), may view an image that is behind him or her, with the first mirror providing a reversed image, while the second mirror (20) provides a reversal of the image seen in the first (12) mirror so as to yield a true version of the image in the second mirror (20).

Figure 4:
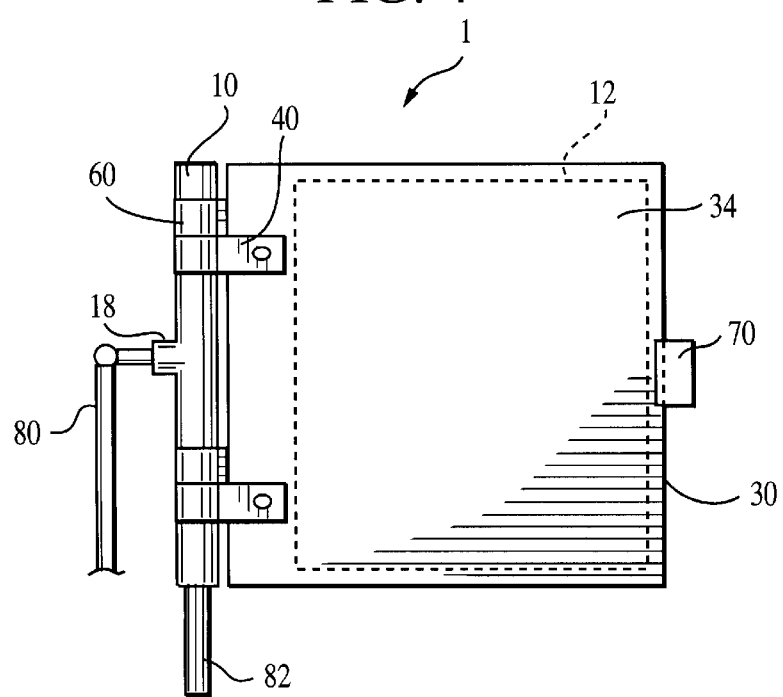
FIG. 4 is a side view of the embodiment shown in FIG. 1.

For ease of orienting these mirrors (12, 20), FIG. 4 illustrates that the support member (10) is equipped with a connector (18) which provides a means for connecting the support member to any one of a multitude of possible mechanisms, such as a gooseneck arm or a three-dimensional swivel connector, that are part of a support stand (80). This allows the support member (10), and thus the mirrors (12, 20), to be oriented in a full, three-dimensional spectrum of planes for viewing an image that is behind a user of the apparatus.

Figure 1:
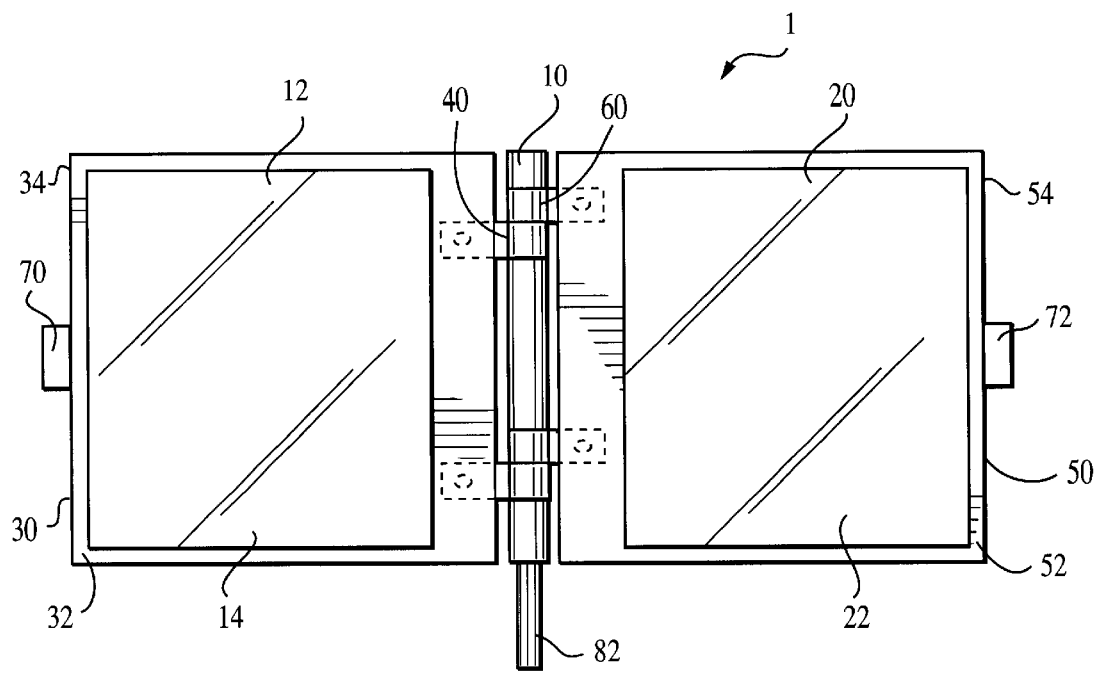
FIG. 1 is a view of a preferred embodiment of the present invention.

Additionally, FIG. 1 indicates that another embodiment of the present invention may be provided with tabs (70, 72) which attach to the housing outside surfaces (34, 54) in order to allows the mirrors (12, 20) to be easily rotated about the support member (10) without an apparatus user having to touch the mirrors' front, reflective surfaces (14, 22). Furthermore, a handle (82) may be attached to the support member (10) in order to aid in spatially orienting the support member (10) with respect to its support stand (80).

FIG. 5 and 6 illustrate the use of the present invention. For a workshop being conducted by a general speaker/presenter (92) and interpreted for the deaf and hard of hearing by a sign language interpreter (90), the image viewing apparatus (1) is used to allow the speaker and interpreter to view visual information (94) being displayed outside his/her direct field of view while continuing to face the audience (96). A user (90, 92) mounts and places the apparatus on a supporting stand (80) before him/her and properly orients the mirror housings (30, 50) to view the visual information (94) being projected onto a projection screen (98) by the projector (100). When the visual information is to be read, the information's image first reflects reversed in the first mirror (12), while the second mirror (20) provides a reversal of the image seen in the first (12) mirror so as to yield a true version of the image in the second mirror (20).

It should be appreciated that these embodiments of the present invention have great flexibility. For example, the present invention may be supplied with an assortment of mirrors, having a wide range of optical properties, that can be interchanged and detachably mounted on the support member (10). Furthermore, other elements, such as latches to secure the mirrors in a closed position, additional straps for securely mounting the mirrors, or a connector in the top of the support member (10) to provide for extending the member to allow for the mounting of additional mirrors, may be added to further improve the durability and usefulness of the present invention.

While the present invention has been described in a number of embodiments, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

I claim:

1. An image viewing apparatus comprising:

an elongated support member having a first end a second end;

a support mechanism for supporting said elongated support member;

a three-dimensional rotatable connector connected to said elongated support member and said support mechanism;

a first adjustable mirror having a first front and a first rear surface, said first front surface being a substantially reflective surface;

a first means for rotatably and frictionally connecting said first mirror to said elongated support member;

said first means for frictionally connecting said first mirror having a frictional engagement yieldable to manual pressure enabling said first mirror to be quickly and easily adjusted and remain in place as adjusted without any additional fastening or clamping mechanism;

a second adjustable mirror having a second front and a second rear surface, said second front surface being a substantially reflective surface;

a second means for rotatable and frictionally connecting said second mirror to said elongated support member;

said second means for frictionally connecting said second mirror having a frictional engagement yieldable to manual pressure enabling said second mirror to be quickly and easily adjusted and remain in place as adjusted without any additional fastening or clamping mechanism;

said elongated support member along with said first mirror and said second mirror freely suspended in space with respect to said support mechanism; and said first mirror and second mirror are positioned in substantially direct side-by-side relationship to afford substantially full reflection from mirror to mirror.

2. An image viewing apparatus as recited in claim 1 wherein:

said first means including a first mirror housing having an inside surface and an outside surface, said first mirror being detachably mounted to said inside surface with said front mirror surface directed away from said inside surface, and a first strap having two ends and a center portion, said ends attached to said first mirror housing with said center portion adapted so as to frictionally wrap around said support member as to rotatably and detachably connect said first mirror housing to said elongated support member, said second means including a second mirror housing having an inside surface and an outside surface, said second mirror being detachably mounted to said inside surface with said front mirror surface directed away from said inside surface, and a second strap having two ends and a center portion, said ends attached to said second mirror housing with said center portion adapted so as to frictionally wrap around said support member as to rotatably and detachably connect said second mirror housing to said elongated support member.

3. An image viewing apparatus as recited in claim 2 further comprising:

a first tab attached to said first mirror housing outside surface, a second tab attached to said second mirror housing outside surface, wherein said tabs allow said mirrors to be rotated about said member without an apparatus user having to touch said mirror front, reflective surfaces, and a handle attached to said support member which aids in spatially orienting said member with respect to said support stand.

4. An image viewing apparatus as recited in claim 1 further comprising:

a first tab attached to said first mirror, a second tab attached to said second mirror, wherein said tabs allow said mirrors to be rotated about said member without an apparatus user having to touch said mirror front, reflective surfaces, and a handle attached to said support member which aids in spatially orienting said member with respect to said support stand.

5. An image viewing apparatus as recited in claim 1, wherein said first and second means also providing a detachable connection of said mirrors to said elongated support member.

* * * * *